Figure 1:
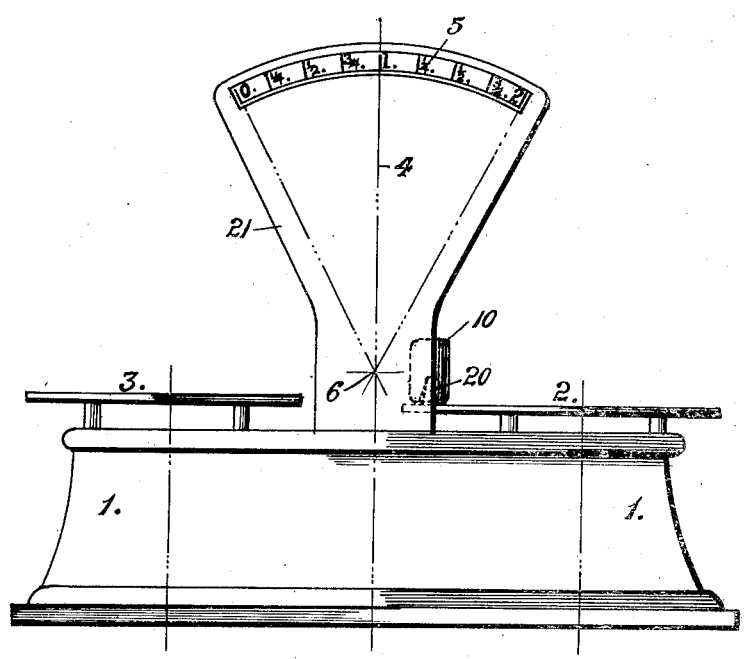

J. DOBSON.
WEIGHING MACHINE.
APPLICATION FILED MAY 18, 1912.

1,061,229.

Patented May 6, 1913.

3 SHEETS—SHEET 1.

Witnesses

Inventor
James Dobson,
By [signature]
Atty.

J. DOBSON.
WEIGHING MACHINE.
APPLICATION FILED MAY 18, 1912.
1,061,229.
Patented May 6, 1913.
3 SHEETS—SHEET 2.
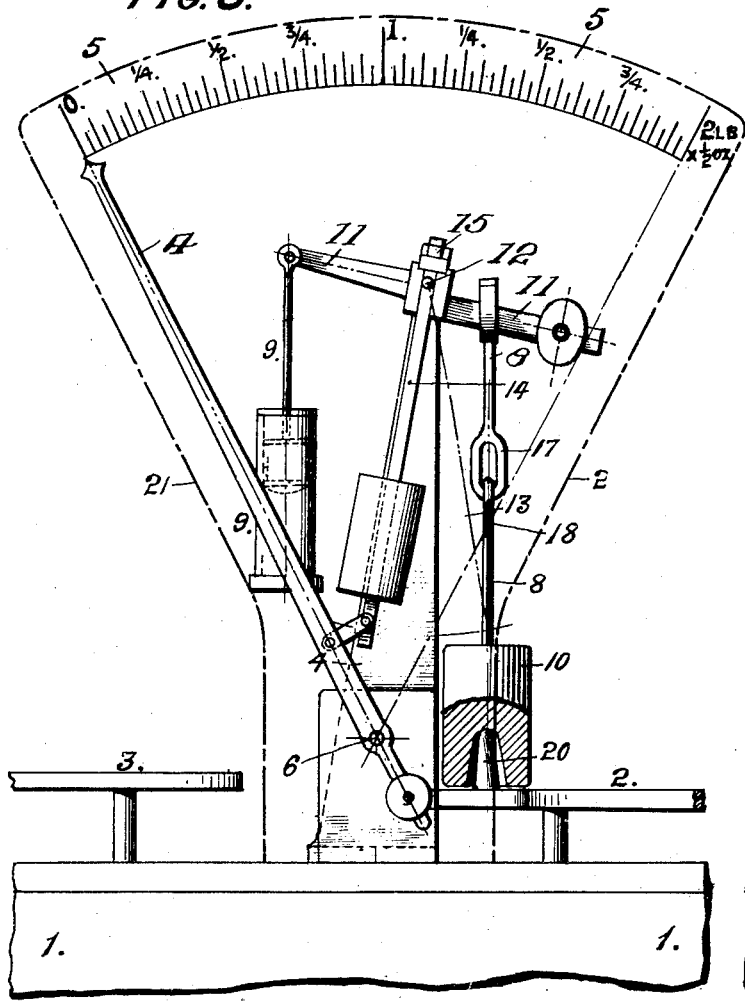
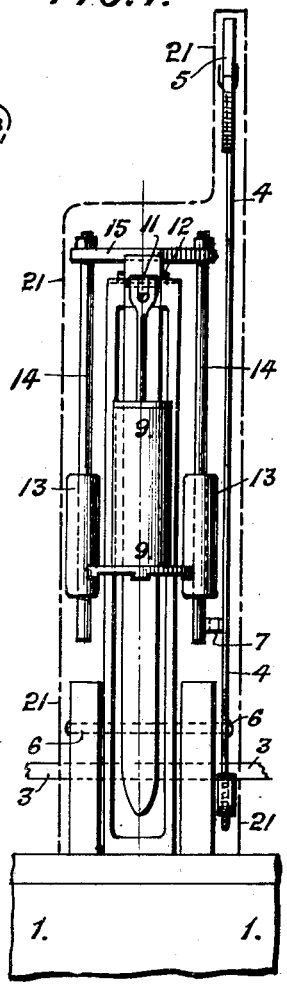
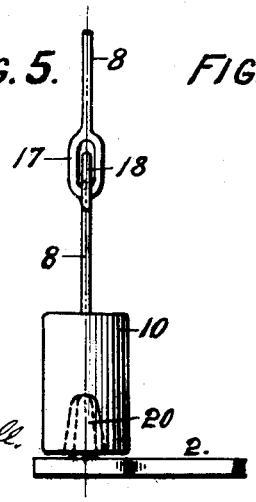
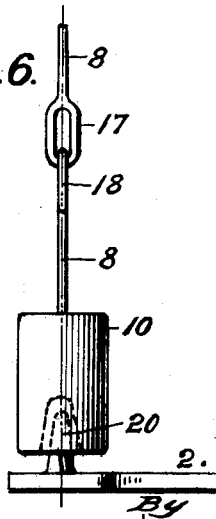
Witnesses
Inventor
James Dobson

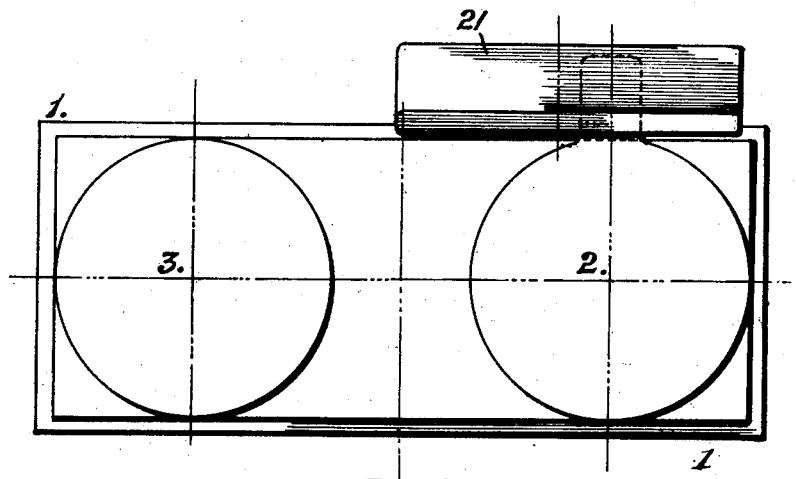
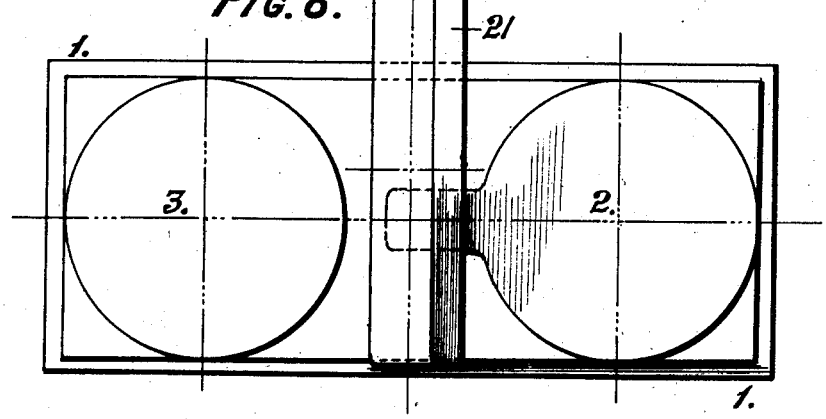

UNITED STATES PATENT OFFICE.

JAMES DOBSON, OF BIRMINGHAM, ENGLAND.

WEIGHING-MACHINE.

1,061,229.  Specification of Letters Patent.  Patented May 6, 1913.

Application filed May 18, 1912. Serial No. 698,245.

*To all whom it may concern:*

Be it known that I, JAMES DOBSON, a subject of the King of England, residing at Birmingham, in the county of Warwick, England, have invented new and useful Improvements in or Connected with Weighing-Machines, of which the following is a specification.

This invention has reference to weighing machines adapted for use on a shop counter, or under like conditions, or for similar purposes, and generally where the loads to be weighed are comparatively small; and more particularly to the type of such machines, wherein a part of the load is indicated on or by a scale automatically, by the machine, and there is used in connection with it, a movable resistance weight which varies in resistance according to its position, and which, plus another weight applied to the weight pan will balance the load.

The chief object and effect of the present invention is to provide improvements in connection with machines of this kind, whereby sudden jar or stress on the indicating mechanism, by applying goods on the pan suddenly, or taking them off suddenly, or by putting or taking off the pan weights suddenly, is almost eliminated.

In connection with the scale weight pan, and the indicating mechanism of a weighing machine according to this invention, there is a constant weight used, which, when the weight pan rises will be acted upon or lifted by it, or pressed by it upward, and thereby when lifted permits the movement of the indicator from zero; while when it falls by the weight pan falling, it moves the pointer over the scale toward zero. Between this weight which acts in connection with the weight pan, or a part connected with it, and the lever or arm which it operates, or which operates in connection with it, there is a free movement arrangement, whereby the weight, when moved upward, does not positively press up said lever or arm; while when it moves downward, it pulls it positively down; and thereby, by this means the sudden movement of the weight pan up, is not transmitted to, and cannot be imparted to the indicating mechanism. In connection with this arm or lever, which is operated through the permanent weight referred to, there are pendant weights acting as resistances, mounted in the same vertical plane as the fulcrum of the arm or lever, to which they are connected; and the levers or bars of these weights are connected with the pointing or indicating finger or lever, or the like, which moves over or in connection with a stationary weight scale; or with a moving scale, which operates in connection with a stationary pointer.

The invention will be further described by the aid of the accompanying drawings, which illustrates a weighing machine provided with improvements hereunder.

Figure 2:
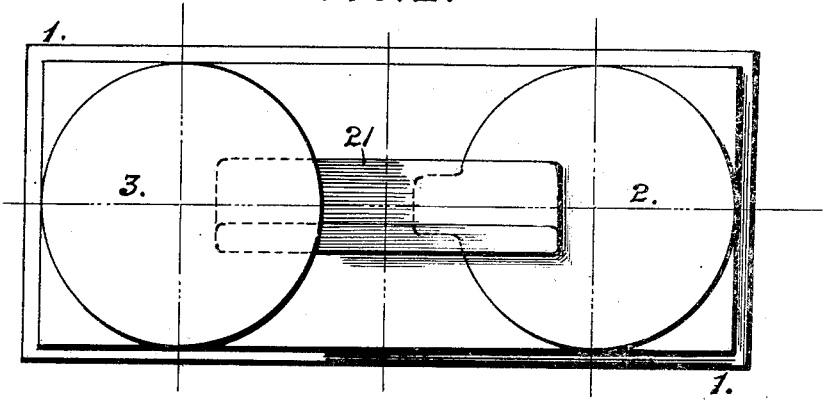

In the drawings, Figure 1 is a side elevation, and Fig. 2 a plan of the machine. Fig. 3 shows in detail a front elevation of the weighing mechanism; and Fig. 4 is a side elevation of it; and Figs. 5 and 6 illustrate parts of the mechanism in different positions. Figs. 7 and 8 are diagrams illustrating the possible alternative relative positions of the parts of the machine, shown in Figs. 1 and 2.

Referring now to the drawings, 1 is the base of the machine in which the pan supporting levers are placed; 2 is the scale weight pan; 3 is the goods pan; 4 is the indicating pointer, pivoted at 6; and 5 the weight scale, over which it works.

10 is the constant weight above referred to, which is used in connection with the scale weight pan 2, and the indicating mechanism; 11 is the arm or lever—pivoted on knife edges at 12—which the weight 10 operates on, and works in connection with; and 13 are weights, supported on the pendant arms 14 (connected to the lever or arm 11 through the cross head 15), which act as the resistances. The weighted arms 14 are mounted in the same vertical plane as the fulcrum 12 of the arm 11; and they are connected to the indicating pointer 4, by a link 7, and operate it.

With regard to the free movement arrangement above referred to, connected with the constant weight 10, and arm or lever 11, this, in the case shown, consists of an elongated loop or eye 17, formed in the upper part of the rod 8 connecting the weight 10 with the arm 11; and a corresponding eye or loop at 18, in the lower portion of the rod 8, by which, when the weight 10 is moved upward, it does not positively press up or upon the lever or arm 11; but when it moves downward, it acts on the lower end of the loop 17, and pulls the upper part of the rod 8, and the arm 11 down. It is by this means, that the sudden movement of the weight pan upward, is not transmitted to, and cannot be imparted to the weighing and indicating mechanism. In the construction and arrangement of weighing machine shown in the drawings, this scale weight pan 2 has upon it a projection 20, and at one side of it; and this projection operates upon the bottom of a recess in the constant weight 10.

The weight 10 should not be less than the capacity of the weighing indicator scale 5. For instance, in the case shown in the drawings, the scale 5 extends from zero to 2 pounds, and consequently, according to this rule, the weight 10 would be 2 pounds.

A dash pot arrangement 9 of any known suitable kind is used in connection with the weighing mechanism; and in the case shown, is disposed on the opposite side of the fulcrum 12 to the lever or arm 11. By this means the motion of the weighing mechanism by the pendant resistance weighted levers 14, when the permanent weight 10 ceases to act on the weighing mechanism, due to a sudden movement as referred to, will slowly move to the correct position, whatever it may be. Moreover, in the action of this controlling dash pot, the weighing mechanism will travel back to zero under the action of the permanent weight when the goods are suddenly taken off the goods pan 3, which causes the weight pan to suddenly fall; but the speed of movement of the weighing mechanism is governed by the dash pot.

In operation, a weight is put on the weight pan 2 of the scale, approximately equal to, but less than the weight of the goods to be weighted. The goods are then put on the weighing pan 3, and the amount shown on the indicator scale 5, plus the weight on the weight pan 2, will, together, equal the whole weight of the goods. When the weight pan 2 rises, due to goods being placed on the other pan 3, the permanent weight 10 will be lifted by the weight pan to a distance corresponding to the excess of weight on the goods pan 3, over and above the weight on the weight pan 2; but this action of placing the goods on the machine will not, in the upward stroke of the pan 2, act suddenly on the weight indicating mechanism. With nothing on the pans 2, 3, the indicating pointer 4 will be standing at zero, with the weights 13 standing in a position of potential to the left hand side of the plane of the fulcrum of the arm 11, being held there by the weight 10. If the goods placed on the goods scale 3 are considerably in excess of the combined weights of the permanent weight 10, and the other weights placed on the pan 2, then the lower part of the rod 8 of the permanent weight 10 will move independently of the other portion of this rod, and so, as it were, automatically disconnect these parts from the weighing lever 10 and weighted arms 14; and so allow the weights 13 to act on the indicating pointer 4, and to be moved over the scale 5 by the pendant resistant weights 13. Hence by this means, all sudden weight or strain coming on the weighing or indicating mechanism, will be avoided under such circumstances. If on the other hand, the goods are suddenly taken off the goods pan 3, the weighing pan 2 will descend suddenly under the action of the weights on it; in which case, the projection or part 20 of the weight pan, which operates in connection with the permanent weight 10, will leave the weight; and so, under the action of the controlling dash pot 9, the weighing mechanism will travel back to zero, under the action of the permanent weight 10, (the pendent weights 13 then standing out at an inclination to the left hand side of the vertical plane of the fulcrum).; the speed of the movement being governed by the dash pot. The latter condition is illustrated by Fig. 6.

When nothing is on the weighing machine, the projection or like device 20 on the weight pan, will be just touching the permanent weight with a small pressure; and when the weights on the two pans 2 and 3 are nearly equal to the weight of the goods, there will be practically no separate action between the permanent weight and the weighing mechanism, and therefore, no sudden action.

In the case shown in the drawings, the pointer or indicator 4 is fixed on a suitable spindle below, and its upper indicating end may be bifurcated, as indicated in Fig. 4, and one pointer arranged to work on each side of the scale 5, so that if the scale is marked on each side, it can be read from both sides.

The weighing mechanism may be inclosed in a suitable casing, with windows opposite the scales 5, as indicated by the dotted lines marked 21.

The weight indicating and weighing mechanism may be disposed in any position in relation to the pans. For instance, in Fig. 1, it is arranged between them, the general plane of the scale, and the path in which the indicator moves, being parallel with the general vertical plane of the machine. Or the scale may be arranged in the same relative plane as that shown in Figs. 1 and 2, but to one side of the transverse central plane of the machine, as indicated in Fig. 7. Or again, it may be arranged in a transverse plane at right angles to the general vertical plane of the machine, as shown in Fig. 8.

While the chief object of the invention, as stated, is to provide improvements whereby sudden jar on the mechanism is eliminated almost entirely, yet the object also is to provide a weighing machine of the character referred to, which, generally speaking, is an improvement on weighing machines of the kind referred to, as hitherto proposed.

What I claim is:—

1. A weighing machine, comprising a weight carrier, a load carrier, and indicating means, a constant weight coöperating with the weight carrier, operating connections between the constant weight and the indicating means to permit operation of the latter, the operating connections serving to exert a normal upward pull on the constant weight and constructed to break said operating connection when a load is suddenly thrown on the load carrier.

2. A weighing machine, comprising a weight carrier, a load carrier, an indicating device, weight operating means, a constant weight normally holding the weight carrier in weighted position, and a connection between the constant weight and the indicating device to hold the later in zero position when the weight carrier is in weighted position, said connection including a device which breaks the connection when a load is suddenly thrown on the load carrier, the connection serving to exert a normal upward pull on the constant weight.

3. A weighing machine, comprising a load carrier, a weight carrier, a constant weight supported by and in loose contact with the weight carrier, indicating means including a device for operating the same and connecting means between the constant weight and the indicating means to permit operation of the latter when a load is placed on the load carrier, said connecting means including means which will permit the constant weight and the weight carrier to move quicker than the indicating means when a load is suddenly thrown on the load carrier, and serves to exert a normal upward pull on the constant weight.

4. A weighing machine, comprising a load carrier, a weight carrier, a constant weight loosely mounted on the weight carrier, indicating means including a pointer and a means for operating same, and a connection between the constant weight and the indicating means including interlooped, elongated members, the said connection serving to exert a normal upward pull on the constant weight, whereby when a load is suddenly thrown on the load carrier, the constant weight will move faster than the pointer, and break said connection.

5. A weighing machine, comprising a load carrier, a weight carrier, a constant weight loosely mounted on the weight carrier, indicating means including a pointer, and means for operating the same, means for cushioning the movement of the pointer, and means between the constant weight and the indicating means to permit the means for operating the latter to move the indicator when the constant weight is moved by a load placed on the load carrier and to permit the constant weight to move faster than the indicator, should a load be suddenly placed on the load carrier, the means between the constant weight and the indicating means serving to exert a normal upward pull on the constant weight.

6. A weighing machine, comprising a load carrier, a weight carrier provided with a projection, a constant weight having a seat which receives the projection, a stem extending from the constant weight and formed at its end with an elongated eye, a pivoted pointer, a pivoted bar having arms, weights on the arms, which serves to exert a normal pull on the constant weight, a link connecting one of the arms and the pointer, and a stem secured to the pivoted bar and formed at its free end with an elongated eye which is looped with the eye on the stem extending from the constant weight.

7. A weighing machine, comprising a load carrier, a weight carrier provided with a projection, a constant weight having a seat which receives the projection, a stem extending from the constant weight and formed at its ends with an elongated eye, a pivoted pointer, a pivoted bar having arms, weights on the arms which serves to exert a normal pull on the constant weight, a link connecting one of the arms and the pointer and a stem secured to the pivoted bar and formed at its free end with an elongated eye which is looped with the eye on the stem extending from the constant weight, a dash pot, a rod extending from the pivoted rod, and a piston on the rod, said piston operating in the dash pot.

8. A weighing scale, comprising a load carrier, a weight carrier, indicating mechanism and means between the weight carrier and the indicating means for operating the latter including two members one of which is formed with a slot to receive the other said member and a constant weight so constructed that the weight carrier and the constant weight may be depressed quicker when a weight is suddenly thrown on said weight carrier than the movement of the indicating means, and also permits of the weight carrier rising faster than the movement of the indicating means when a load is suddenly thrown on the load carrier.

In testimony whereof I have signed my name to this specification in the presence of two subscribing witnesses.

JAMES DOBSON.

Witnesses:
SOMERVILLE GOODALE,
RICHARD CUTHBERT ROYSTON.

---

Copies of this patent may be obtained for five cents each, by addressing the "Commissioner of Patents, Washington, D. C."